United States Patent [19]

Nagasawa et al.

[11] Patent Number: 5,310,813
[45] Date of Patent: May 10, 1994

[54] THERMOSETTING COATING RESIN AND PROCESS FOR PRODUCING THE SAME

[75] Inventors: Mitsuru Nagasawa, Nagoya; Kazuyuki Kuwano, Toyota; Masataka Muramatsu, Okazaki; Kishiro Azuma, Tokai; Hiroshi Hibino; Kazuko Nakanishi, both of Nagoya, all of Japan

[73] Assignees: Toagosei Chemical Industry Co., Ltd., Minato; Toyota Jidosha Kabushiki Kaisha, Toyota, both of Japan

[21] Appl. No.: 43,585

[22] Filed: Apr. 5, 1993

Related U.S. Application Data

[63] Continuation-in-part of Ser. No. 749,075, Aug. 23, 1991, abandoned.

[30] Foreign Application Priority Data

Aug. 24, 1990 [JP] Japan ................................. 2-221145

[51] Int. Cl.$^5$ ................... C08F 265/06; C08F 265/04; C08F 267/02; C08F 265/02
[52] U.S. Cl. .................................. 525/309; 525/276; 525/296; 525/301; 525/303; 525/310
[58] Field of Search ............... 525/276, 296, 301, 303, 525/309, 310

[56] References Cited

U.S. PATENT DOCUMENTS

| | | | |
|---|---|---|---|
| 3,842,059 | 10/1974 | Milkovich et al. | 525/292 |
| 4,154,778 | 5/1979 | Ohya et al. | 525/310 |
| 4,584,354 | 4/1986 | Hudecek et al. | 525/296 |
| 4,613,652 | 9/1986 | Nakayama et al. | 525/276 |
| 4,659,781 | 4/1987 | Okude et al. | 525/279 |
| 4,804,732 | 2/1989 | Ryntz et al. | 528/28 |
| 4,810,759 | 3/1989 | Ryntz | 525/440 |

FOREIGN PATENT DOCUMENTS

| | | | |
|---|---|---|---|
| 0231666 | 8/1987 | European Pat. Off. | |
| 0307504 | 3/1989 | European Pat. Off. | |
| 2113097 | 10/1973 | Fed. Rep. of Germany | 525/309 |
| 110702 | 6/1985 | Japan | |
| 2100512 | 5/1987 | Japan | 525/309 |
| 101462 | 5/1988 | Japan | |
| 1245067 | 9/1989 | Japan | |
| 2199108 | 8/1990 | Japan | 525/276 |
| 2142637 | 1/1985 | United Kingdom | |
| 2151636 | 7/1985 | United Kingdom | |

OTHER PUBLICATIONS

Polymer Journal vol. 18, No. 8, pp. 581–591 (1986), "Studies on p– and m–Vinylbenzylmagnesium Chlorides as Initiators and Monomers—Preparations of Macromers and Poly(Grinard Reagent)s"; K. Hatada, H. Nakanishi, Koichi Ute, and Kitayama.

*Primary Examiner*—Paul R. Michl
*Assistant Examiner*—Peter Szekely
*Attorney, Agent, or Firm*—Browdy and Neimark

[57] ABSTRACT

The present invention provides a thermosetting coating resin consisting of a branched polymer, which branched polymer is obtained by copolymerizing a macromolecular monomer having a radical-polymerizable group at one end in the molecule and having a weight-average molecular weight of 1,000–10,000, with another radical-polymerizable monomer, which branched polymer contains the unit of said macromolecular monomer in a proportion of 40–99.5% by weight based on the amount of total constitutional units, which branched polymer has a cross-linkable functional group, and which branched polymer has a weight-average molecular weight of 5,000–30,000. The present invention further provides a process for producing such a thermosetting coating resin.

11 Claims, No Drawings

THERMOSETTING COATING RESIN AND PROCESS FOR PRODUCING THE SAME

This application is a continuation-in-part of Ser. No. 07/749075 filed Aug. 23, 1991, now abandoned.

The present invention relates to a thermosetting coating resin suitably used for coating of automobiles, household electric appliances, etc., as well as to a process for producing such a thermosetting coating resin.

Conventionally, as a thermosetting coating used for coating of automobiles, household electric appliances, etc., acrylic coatings have been widely used because of their excellent weather resistance and appearance.

As the acrylic resin constituting the main component of the above acrylic coatings, there have been generally used those resins obtained by radical-copolymerizing an alkyl (meth)acrylate (e.g., butyl acrylate, methyl methacrylate, or butyl methacrylate) with a functional group-containing monomer (e.g., 2-hydroxyethyl methacrylate, or 2-hydroxypropyl methacrylate). Coatings obtained by adding, to an organic solvent solution of the above acrylic resin, a crosslinking agent such as melamine, polyisocyanate or the like, are coated and then baked to form a strong coating film having a three-dimensionally crosslinked network structure.

As mentioned above, thermosetting acrylic coatings are handled ordinarily in the form of an organic solvent solution. Recently, there has been an increasing requirement for reducing the amount of the organic solvent used in solvent type coatings, from the standpoints of environmental protection and resource conservation. As a countermeasure therefor, it is under investigation to increase the solid content in coating solution, i.e., to develop a coating of high solid content.

In order to retain good coatability even under a high solid content, it is necessary to keep the viscosity of the coating solution at a certain level or lower. Therefore, various ideas have been proposed in formulating a coating of high solid content, and investigations are currently under way mainly in lowering the molecular weight of a coating resin used.

When the molecular weight of an acrylic resin used is lowered, however, the proportion of the polymer molecule having no functional group, i.e., the polymer molecule not taking part in formation of a network structure during curing is increased in the acrylic resin; as a result, the coating film obtained therefrom has reduced durability.

In order to solve the above problem, it is under investigation to increase the proportion of a functional group-containing monomer in the total monomers used for an intended acrylic resin and also increase the amount of a crosslinking agent (e.g., melamine, or polyisocyanate) in proportion to the increase of said monomer. However, this approach gives an acrylic resin having too high a crosslinking density and resultantly a coating film of inferior flexibility and brittleness.

Development of a coating of high solid content is under investigation also from different approaches. As an example, there is a proposal of using a branched polymer as a coating resin.

That is, Japanese patent Post-Exam. Publication No. 64-11076 (Laid-Open No. 60-110702) proposes using, as a coating resin, a branched polymer obtained by reacting a polyfunctional epoxy compound represented by the chemical formula:

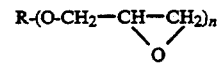

(R is a hydrocarbon residue of aliphatic type, alicyclic type, aromatic type or the like, and n is an integer of 3-6) with an acrylic polymer having a carboxyl group at one end and having a molecular weight of 1,000-100,000. The document mentions that an organic solvent solution of the branched acrylic polymer has a viscosity about 30-50% lower than an organic solvent solution of a straight-chain acrylic polymer having about the same average molecular weight.

However, the number of branches per molecule of the above branched acrylic polymer is restricted by the n of the chemical formula:

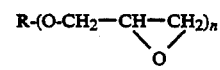

, and it is virtually impossible to allow the polymer to have a large number of branches; consequently, a coating of high solid content can be obtained but with a restriction.

Also, a graft copolymer obtained by radical-copolymerizing a macromolecular monomer having a radical-polymerizable group with an acrylic acid ester, is known as a branched polymer (U.S. Pat. No. 3,842,059). Use of such a graft copolymer as a coating resin is proposed, as mentioned below.

U.S. Pat. No. 4,804,732 discloses, as a thermosetting coating resin, a graft copolymer obtained by copolymerizing a polysiloxane macromolecular monomer with an acrylic acid ester monomer. The document mentions that the graft copolymer can give a coating of low viscosity but high solid content. However, the polysiloxane macromolecular monomer is a macromolecular monomer obtained by reacting a polysiloxane having a hydroxyl value of about 50-150 with glycidyl methacrylate at a molar ratio of 2:1 to 1:2, preferably 1:1, and contains polysiloxane molecules each having a plurality of carbon-carbon double bonds derived from glycidyl methacrylate and polysiloxane molecules containing no such double bond.

Japanese Patent Unexamined Laid-Open No. 64-245067 discloses a two-pack acrylic urethane coating consisting of (a) an acrylic graft copolymer obtained by using a macromolecular monomer having a radical-polymerizable group at one end and (b) a polyisocyanate compound. Japanese Patent Unexamined Laid-Open No. 63-101462 discloses a room temperature-drying type coating consisting of a similar graft copolymer. In these inventions, a graft copolymer is used as a coating resin in order to allow the coating film formed therefrom to have improved properties; however, no mention is made of any coating of high solid content.

The invention disclosed in EP 231666 relates to a polyester paint mainly comprising a hydroxy functional polyester graft copolymer, which paint has a high solids content but a low solution viscosity. However, as hereinafter explained, said hydroxy functional polyester graft copolymer contains a substantial amount of low molecular weight hydroxy functional polyesters which have not been converted into the graft copolymer. In forming the coated film, it is necessary to crosslink also the hydroxy functional polyesters and hence to use a substantial amount of a crosslinking agent, which causes the problem of excess crosslinking in the coated film.

That is, in the invention disclosed in EP 231666, a hydroxy functional polyester macromolecular monomer is used as a starting material for producing the hydroxy functional polyester graft copolymer. This macromolecular monomer is obtained by reacting a low molecular weight hydroxy functional polyester having plural hydroxy groups at non-specific positions of the molecule chain with glycidylmethacrylate.

This reaction produces not only a hydroxy functional polyester macromolecular monomer having one methacryloyl group per molecule but also polyester macromolecular monomers having two or more methacryloyl groups per molecule, which cause gelling when copolymerized with another radical-polymerizable monomer. Therefore, it is necessary to use only a small proportion of glycidylmethacrylate to prevent forming a substantial amount of polyesters causing gelation. Accordingly, the resultant macromolecular monomer contains a substantial amount of low molecular weight hydroxy functional polyesters having no radical-polymerizable groups.

A hydroxy functional polyester graft copolymer which is obtained by copolymerizing the macromolecular monomer obtained by said method with another radical-polymerizable monomer, unavoidably contains an undesirably great amount of low molecular weight hydroxy functional polyesters.

SUMMARY OF THE INVENTION

The present invention is intended to provide a coating composition consisting of thermosetting resin comprising cross-linkable branched polymer capable of providing a coating solution of high solid content but low viscosity, and to provide a process for producing such a resin.

The present inventors made extensive study in order to solve the above-mentioned problems and, as a result, found that a branched polymer which is obtained from a radical-polymerizable macromolecular monomer having a weight-average molecular weight of 1,000–10,000 and which contains the unit of said macromolecular monomer in a proportion of 40% by weight or more based on the amount of the total constitutional units and has a weight-average molecular weight of 5,000–30,000, gives a low viscosity when made into an organic solvent solution of high solid content. The finding has led to the completion of the present invention.

The present invention lies in a thermosetting coating resin consisting of a branched polymer, which branched polymer is obtained by copolymerizing a macromolecular monomer having a radical-polymerizable group at one end in the molecule and having a weight-average molecular weight of 1,000–10,000, with another radical-polymerizable monomer, which branched polymer contains the unit of said macromolecular monomer in a proportion of 40–99.5% by weight based on the amount of the total constitutional units, which branched polymer has a crosslinkable functional group, and which branched polymer has a weight-average molecular weight of 5,000–30,000.

The present invention further lies in a process for producing a thermosetting coating resin having a crosslinkable functional group in the molecule and having a weight-average molecular weight of 5,000–30,000, which process comprises subjecting polymerizable components (c) to radical copolymerization by using 1–10 mole %, based on the total moles of the polymerizable components (c), of a radical polymerization initiator, said polymerizable components (c) consisting of 40–99.5% by weight of (a) a macromolecular monomer having a radical-polymerizable group at one end in the molecule and having a weight-average molecular weight of 1,000–10,000 and 60–0.5% by weight of (b) another radical-polymerizable monomer.

The present invention is hereinafter described in more detail.

[Macromolecular Monomer]

The macromolecular monomer used in the present invention is, as mentioned above, a high-molecular monomer having a weight-average molecular weight of 1,000–10,000 and having a radical-polymerizable group at one end in the molecule. As the radical-polymerizable group, there can be mentioned (meth)acryloyl group, styryl group, allyl group, vinylbenzyl group, vinyl ether group, vinyl ketone group, etc. Among them (meth)acryloyl group is preferred.

The above weight-average molecular weight of the macromolecular monomer is obtained by a method ordinarily used in the measurement of weight-average molecular weight of a polymer, for example, gel permeation chromatography (hereinafter referred to as GPC) or small-angle light-scattering method. When the weight-average molecular weight of the macromolecular monomer is more than 10,000, the resulting branched polymer has too high a molecular weight and, when made into a solution, has too high a viscosity, which gives poor coatability. Meanwhile, when the weight-average molecular weight of the macromolecular monomer is less than 1,000, the resulting branched polymer gives a high solution viscosity, which makes it impossible to obtain a coating of high solid content. The preferable weight-average molecular weight of the macromolecular monomer is 1,000–5,000.

As the monomer constituting the polymer backbone of the macromolecular monomer, i.e., the monomer constituting the moiety supporting the radical-polymerizable group of the macromolecular monomer, there can be mentioned methyl (meth)acrylate, ethyl (meth)acrylate, butyl (meth)acrylate, 2-ethylhexyl (meth)acrylate, perfluoroalkyl acrylates, 2-hydroxyethyl (meth)acrylate, 2-hydroxypropyl (meth)acrylate, styrene, α-methylstyrene, (meth)acrylonitrile, polyethylene glycol mono(meth)acrylate, etc. These monomers can be used alone or in combination of two or more.

The polymer backbone of the macromolecular monomer preferably has a crosslinkable functional group as mentioned later, such as hydroxyl group or carboxyl group.

The macromolecular monomer can be synthesized by various methods such as the methods described in the second chapter (synthesis of macromolecular monomer) (pages 39–77) of "Chemistry and Industry of Macromolecular Monomer" (edited and written by Yuya Yamashita) published from I. P. C. Publishing on Sep. 20, 1989.

That is, the macromolecular monomer can be synthesized, for example, by a method which comprises subjecting an anion-polymerizable monomer (e.g., styrene) to solution polymerization in the presence of an anion polymerization initiator (e.g., butyllithium) to prepare a monofunctional living polymer, subjecting the monofunctional living polymer to end capping with ethylene oxide or the like when the molecular weight of the living polymer has reached a desired level, and reacting the reaction product with methacrylic acid chloride or the like to obtain a macromolecular monomer having a radical-polymerizable group (e.g., methacryloyl group) at one end (Japanese Patent Laid-Open No. 51-125186 corresponding to U.S. Pat. No. 3,482,059); a method which comprises anion-polymerizing methyl methacrylate in the presence of p-vinylbenzylmagnesium chloride (initiator) at a low temperature to obtain a polymethyl methacrylate macromolecular monomer having a p-vinylbenzyl group at one end (Polym. J., 18, p. 581, 1986); and a method which comprises radical-polymerizing a radical-polymerizable monomer [e.g., (meth)acrylic acid ester, styrene, or acrylonitrile] in the presence of a chain transfer agent of carboxyl group-containing mercaptan type (e.g., thioglycolic acid, or mercaptopropionic acid) in an organic solvent to prepare a polymer having a carboxyl group at one end in the molecule, and reacting the polymer with glycidyl (meth)acrylate to obtain a macromolecular monomer having a methacryloyl group at one end in the molecule (Japanese Patent Laid-Open No. 60-133007, etc.).

Further, the macromolecular monomer having carboxyl groups in the polymer backbone can be synthesized by a method which comprises synthesizing a macromolecular monomer having tertiary alkyl ester groups such as t-butyl (meth)acrylate monomer unit or the like, and decomposing the t-butyl carboxylate group in the presence of an acid catalyst into a carboxyl group and isobutylene to form a macromolecular monomer having carboxyl groups.

[Branched Polymer]

The branched polymer of the present invention is a polymer which consists of a unit of the above-mentioned macromolecular monomer and a unit of another radical-polymerizable monomer (the proportion of the macromolecular monomer unit being 40-99.5% by weight based on the amount of the total constitutional units) and which contains a crosslinkable functional group in the molecule and has a weight-average molecular weight of 5,000-30,000. This branched polymer is a kind of graft copolymer wherein a number of branch polymers derived from the macromolecular monomer have been bonded to a trunk polymer of short chain.

The above-mentioned weight-average molecular weight of the branched polymer is a value measured by small-angle light-scattering method. When the weight-average molecular weight is less than 5,000, such a branched polymer gives a coating film of inferior durability. When the weight-average molecular weight is more than 30,000, such a branched polymer gives a coating solution of high viscosity and accordingly of poor coatability.

When the proportion of the macromolecular monomer unit is less than 40% by weight, such a branched polymer has insufficient branching degree and, when made into a solution of high solid content, gives a high viscosity, which makes it impossible to obtain a practical coating solution of high solid content. When the proportion of the macromolecular monomer unit is more than 99.5% by weight, such a branched polymer is difficult to synthesize at a high purity and contains a large amount of non-polymerized macromolecular monomer, which gives a coating film of poor durability. The preferable proportion of the macromolecular monomer unit is 45-95% by weight. The most preferred proportion of the macromolecular monomer unit is 65-95% by weight.

As the other radical-polymerizable monomer to be copolymerized with the macromolecular monomer, there can be mentioned alkyl (meth)acrylates wherein the alkyl group has 1-18 carbon atoms, vinyl acetate, styrene, α-methylstyrene, (meth)acrylonitrile, perfluoroalkyl (meth)acrylates, (meth)acrylic acid, maleic anhydride, 2-hydroxyethyl (meth)acrylate, 2-hydroxypropyl (meth)acrylate, glycidyl (meth)acrylate, (meth)acrylamide, N-methylolacrylamide, N-butoxymethylacrylamide, N,N-dimethylaminoethyl (meth)acrylate, (meth)acryloyloxypropyltrimethoxysilane, etc.

It is necessary that the branched polymer have a crosslinkable functional group. The crosslinkable functional group is preferably hydroxyl group, carboxyl group, amino group, glycidyl group, —CONH(CH$_2$OR) (R is hydrogen atom or an alkyl group), or the like. Hydroxyl group or carboxyl group is more preferable. The crosslinkable functional group which must be present in the branched polymer, may be two or more kinds. The crosslinkable functional group may be present at the macromolecular monomer portion, or at the portion of the trunk polymer formed by the monomer other than the macromolecular monomer, or at the two portions.

In order to introduce the crosslinkable functional group into the trunk polymer portion, there is used, as the monomer to be copolymerized with the macromolecular monomer, a crosslinkable functional group-containing monomer among the above-mentioned monomers, such as (meth)acrylic acid, maleic anhydride, 2-hydroxyethyl (meth)acrylate, glycidyl (meth)acrylate or the like. (Meth)acrylic acid or 2-hydroxyethyl (meth)acrylate is preferred.

The preferable amount of the crosslinkable functional group in the branched polymer differs slightly depending on the type of the functional group, but is about 0.5-30% by weight based on the amount of the total monomer units constituting the branched polymer when expressed as the amount of the unit of the crosslinkable functional group-containing monomer.

Preferably, the branched polymer used in the present invention is constituted mainly by the unit of an acrylic monomer typified by a (meth)acrylic acid ester, in view of the weather resistance of the coating film formed therefrom. Specifically, it is preferable that the macromolecular monomer unit or the trunk polymer formed by the other radical-polymerizable monomer contain at least 50% by weight, based on the amount of the total monomer units, of an acrylic monomer unit. The acrylic monomer is preferably methyl (meth)acrylate, ethyl (meth)acrylate, propyl (meth)acrylate, butyl (meth)acrylate or octyl (meth)acrylate.

The branched polymer can be obtained by radical-copolymerizing the macromolecular monomer and the other radical-polymerizable monomer (these monomers are hereinafter referred to as polymerizable components) in an organic solvent.

The organic solvent is preferably toluene, xylene, methyl ethyl ketone, methyl isobutyl ketone or the like. The concentration of the polymerizable components in the solution polymerization is preferably 10-80% by weight. The polymerization temperature is suitably about 60°-100° C.

As the polymerization initiator, there can be used an azo type compound such as 2,2-azobisisobutyronitrile (hereinafter referred to as AIBN) or the like, or an organic peroxide such as benzoyl peroxide or the like. The required amount of the initiator is 1–10 moles, preferably 5–10 moles per 100 moles of the total polymerizable components.

The molecular weight of the branched polymer can be effectively controlled by the use of a chain transfer agent in combination with the polymerization initiator. As the chain transfer agent, there can be mentioned dodecyl mercaptan, lauryl mercaptan, thioglycolic acid, etc. The preferable amount of the chain transfer agent used is 1–40 moles per 100 moles of the total polymerizable components.

The branched polymer which is the thermosetting coating resin of the present invention can be cured, for example, by the following method.

The branched polymer having a carboxyl group as the crosslinkable functional group can be cured by heating to 120°–160° C. in the presence of, as a cross-linking agent, an amino resin such as hexamethylolmelamine, hexabutoxymelamine or a condensation product thereof.

The branched polymer having a hydroxyl group can be cured at room temperature or under heating, by using, as a crosslinking agent, a polyisocyanate (e.g., hexamethylene diisocyanate, tolylene diisocyanate, or isophorone diisocyanate) or an adduct thereof.

The branched polymer having a glycidyl group can be cured by heating to 80° to 200° C. using, as a crosslinking agent, a polycarboxylic acid in the presence of a curing accelerator such as tertiary amine, quaternary ammonium salt or the like. It can also be cured at room temperature or under heating, by using a polyamine such as triethylenetetramine as a crosslinking agent.

The amount of the crosslinking agent used can be appropriately determined according to the known technique.

The branched polymer having N-methylolamide group as the crosslinkable functional group is self-cured by heating and needs no crosslinking agent.

The present invention is hereinafter described more specifically by showing Examples and Comparative Examples. Incidentally, the macromolecular monomers used in the Examples were those obtained in the following Referential Examples.

REFERENTIAL EXAMPLE 1

106.2 parts by weight of toluene was fed into a glass flask equipped with a stirrer, a reflux condenser, a dropping funnel, a thermometer and a nitrogen gas inlet. Into the flask was continuously added dropwise a mixed solution consisting of 80 parts by weight of methyl methacrylate (hereinafter referred to as MMA), 20 parts by weight of 2-hydroxyethyl methacrylate (hereinafter referred to as HEMA), 10.6 parts by weight of mercaptoacetic acid as a chain transfer agent and 2 parts by weight of AIBN as a polymerization
initiator, at 80°–85° C. in 3 hours while nitrogen gas was being blown therein, to carry out polymerization. After the completion of the dropwise addition, the heating was continued further for 2 hours to complete the polymerization to obtain a polymer having a carboxyl group at one end in the molecule.

A part of the toluene solution of the polymer was taken out and mixed with hexane to precipitate and separate the polymer. The polymer was measured for acid value. The acid value was 0.82 mg equivalent/g.

To the toluene solution of the polymer was added 200 ppm of hydroquinone monomethyl ether as a polymerization inhibitor. To the resultant solution were added glycidyl methacrylate of 1.1 times equivalents the above acid value, and a quaternary ammonium salt as a catalyst, and they were kept at 90° C. for 6 hours to react the end carboxyl group of the polymer with glycidyl methacrylate. The reactivity calculated from the decrease in acid value was 98.5%.

From the above procedure was obtained a macromolecular monomer of MMA/HEMA =80/20 (weight ratio) having a methacryloyl group at one end in the molecule, and having a polystyrene-reduced number-average molecular weight of 1,340 and a polystyrene-reduced weight-average molecular weight of 2,600 as measured by GPC.

REFERENTIAL EXAMPLE 2

The following monomers were radical-polymerized in the same manner as in Referential Example 1 to synthesize a macromonomer precursor, i.e., a polymer having a carboxyl group at one end.

Styrene/butyl methacrylate/butyl acrylate/hydroxyethyl methacrylate=30/30/20/20 (weight ratio)

The polymer was reacted with glycidyl methacrylate to synthesize a macromolecular monomer having a methacryloyl group at one end in the molecule. It had a number-average molecular weight of 1,220 and a weight-average molecular weight of 2,060.

EXAMPLE 1

There was prepared a toluene solution which contained 20% by weight of polymerizable components consisting of the macromolecular monomer obtained in Referential Example 1, styrene and MMA (the weight ratio=45/25/30) and 8.4 mole %, based on the total moles of the polymerizable components, of AIBN as a polymerization initiator. The solution was subjected to polymerization at 60° C. for 8 hours.

The resulting polymer solution was subjected to GPC to determine the amount of non-polymerized macromolecular monomer. The amount was 10% by weight based on the macromolecular monomer fed. As a result, the composition of the branched polymer obtained was found by calculation to consist of 42% by weight of the macromolecular monomer unit, 26% by weight of the styrene unit and 32% by weight of the MMA unit, the styrene unit and the MMA unit constituting the trunk moiety. The branched polymer had a weight-average molecular weight (Mw) as measured by small-angle light-scattering method and a solution viscosity (0) (a viscosity measured by an Ubbelohde viscometer at 25° C. for an acetone solution containing 40% by weight of the branched polymer; the same applies hereinafter) as shown below.

Mw: 14,000

$\eta$:11.6 cp

EXAMPLE 2

A branched polymer was produced in the same manner as in Example 1 except that the polymerizable components consisted of 70% by weight of the macromolecular monomer obtained in Referential Example 1, 12% by weight of MMA and 18% by weight of styrene.

GPC analysis of the polymerization product indicated the presence of 10% by weight, based on the macromolecular monomer fed, of non-polymerized macromolecular monomer. As a result, the composition of the branched polymer obtained was found by calculation to consist of 68% by weight of the macromolecular monomer unit, 13% by weight of MMA unit and 19% by weight of the styrene unit, the MMA unit and the styrene unit constituting the trunk moiety.

The Mw and η of the branched polymer measured in the same manner as in Example 1 were as follows.
Mw: 23,100
η: 13.2 cp

EXAMPLE 3

There was prepared a toluene solution which contained 20% by weight of polymerizable components consisting of 93% by weight of the macromolecular monomer obtained in Referential Example 1 and 7% by weight of styrene, 8.4 mole %, based on the total moles of the polymerizable components, of AIBN as a polymerization initiator, and 7.5 mole %, based on the total moles of the polymerizable components, of lauryl mercaptan as a chain transfer agent. The solution was subjected to polymerization at 60° C. for 8 hours.

GPC analysis of the polymerization product indicated the presence of 15% by weight, based on the macromolecular monomer fed, of non-polymerized macromolecular monomer, from which the composition of the branched polymer obtained was found to consist of 92% by weight of the macromolecular monomer unit and 8% by weight of the styrene unit.

The Mw and θ of the branched polymer were as follows.
Mw: 19,000
θ: 11.4 cp

EXAMPLE 4

A branched polymer was produced in the same manner as in Example 3 except that the polymerizable components consisted of 95% by weight of the macromolecular monomer obtained in Referential Example 2 and 5% by weight of butyl methacrylate.

The resulting polymer solution contained 20% by weight, based on the macromolecular monomer fed, of non-polymerized macromolecular monomer. The branched polymer obtained from the solution had a Mw of 23,000 and an θ of 12.8 cp.

COMPARATIVE EXAMPLES 1 AND 2

80% by weight of MMA and 20% by weight of HEMA were dissolved in a toluene-isobutanol mixed solvent to prepare a solution having a total monomer concentration of 20% by weight. Thereto were added 8.4 mole %, based on the total moles of the polymerizable components, of AIBN and 4 mole % of lauryl mercaptan (Comparative Example 1), or 8.4 mole % of AIBN and 1 mole % of lauryl mercaptan (Comparative Example 2). The resulting mixture was subjected to the same polymerization as in Example 1.

Each of the resulting polymers had the following Mw and θ.

|        | Comp. Ex. 1 | Comp. Ex. 2 |
|--------|-------------|-------------|
| Mw     | 14,000      | 22,000      |
| η (cp) | 21.2        | 70.3        |

COMPARATIVE EXAMPLE 3

Only the macromolecular monomer obtained in Referential Example 2 was polymerized under the same conditions as in Example 3.

The resulting polymer solution contained 45% by weight, based on the macromolecular monomer fed, of non-polymerized macromolecular monomer. The polymer containing non-polymerized macromolecular monomer had a Mw as low as 4,400 and was not suitable for use in coating.

As clear from the foregoing Examples and Comparative Examples, the resin solutions obtained in Comparative Examples had too high a viscosity and were not suitable for use in coating, while Examples of the present invention easily produced thermosetting coating resins showing a low solution viscosity even at a high concentration, which were suitably usable to prepare a coating of high solid content.

ADDITIONAL COMPARATIVE EXPERIMENTS

Similarly to Example 1, the macromolecular monomer obtained in Referential Example 2 and butylmethacrylate were copolymerized at the undermentioned weight ratios to produce branched polymers (A), (B) and (C). The weight average molecular weights (Mw) and solution viscosities (θ) of the resultant branched polymers (A), (B) and (C) were as follows:

|     | wt. ratio         | Mw     | η    |
|-----|-------------------|--------|------|
| (A) | M.M/BM = 45/55    | 11,800 | 11.3 |
| (B) | M.M/BM = 55/45    | 11,800 | 10.8 |
| (C) | M.M/BM = 65/35    | 11,400 | 7.2  |

M.M = macromolecular monomer
BM = butylmethacrylate

As is clear from the above table, the branched polymer (C) having the proportion of the macromolecular monomer unit of 65% by weight had approximately the same molecular weight but showed a remarkably low solution viscosity as compared with the branched polymers (A) and (B) having proportions of the unit of 45% by weight and 55% by weight, respectively.

What is claimed is:

1. A coating composition comprising a solution in a suitable solvent of a thermosetting resin containing a branched polymer,
   wherein said branched polymer is obtained by copolymerizing (1) a macromolecular monomer having a radical-polymerizable group at one end of the molecule and having a weight-average molecular weight of 1,000 to 10,000 with (2) another radical-polymerizable monomer,
   which branched polymer contains the unit of said macromolecular monomer in a proportion of 65-95% by weight based on the total amount of constitutional units, which branched polymer has a crosslinkable functional group and contains a unit of an alkyl (meth)acrylate monomer having an alkyl group of 1-8 carbon atoms, in a proportion of 50% by weight or more based on the amount of total monomer units constituting the branched polymer, and which branched polymer has a weight-average molecular weight of 5,000–30,000; and
   the monomer constituting the polymer backbone of the macromolecular monomer is selected from the group consisting of methyl (meth)acrylate, ethyl (meth)acrylate, butyl (meth)acrylate, 2-ethylhexyl(meth)acrylate, perfluoroalkyl acrylates, 2-hydroxyethyl(meth)acrylate, 2-hydroxypropyl(meth)acrylate, styrene, α-methylstyrene, (meth)a- crylonitrile and polyethylene glycol mono(meth)acrylate.

2. A coating composition according to claim 1, wherein the crosslinkable functional group in the branched polymer is hydroxyl group or carboxyl group.

3. A coating composition according to claim 1, wherein the radical-polymerizable group at one end of the macromolecular monomer is selected from the group consisting of (meth)acryloyl group, styryl group, allyl group, vinylbenzyl group, vinyl ether group and vinyl ketone group.

4. A thermoset coating composition according to claim 1, wherein the other radical-polymerizable monomer is selected from the group consisting of alkyl (meth)acrylates wherein the alkyl group has 1-18 carbon atoms, vinyl acetate, styrene, α-methylstyrene, (meth)acrylonitrile, perfluoroalkyl (meth)acrylates, (meth)acrylic acid, maleic anhydride, 2-hydroxyethyl (meth)acrylate, 2-hydroxypropyl (meth)acrylate, glycidyl (meth)acrylate, (meth)acrylamide, N-methylolacrylamide, N-butoxymethylacrylamide, N,N-dimethylaminoethyl (meth)acrylate and (meth)acryloyloxypropyltrimethoxysilane.

5. A process for producing a thermosetting coating resin having a crosslinkable functional group in the molecule and having a weight-average molecular weight of 5,000–30,000, which process comprises subjecting polymerizable components (c) to radical copolymerization by using 5–10 mole %, based on the total moles of the polymerizable components (c), of a radical polymerization initiator, said polymerizable components (c) consisting of 65–95% by weight of (a) a macromolecular monomer having a radical-polymerizable group at one end in the molecule and having a weight-average molecular weight of 1,000–10,000 and 35–5% by weight of (b) another radical-polymerizable monomer.

6. A process for producing a thermosetting coating resin having a crosslinkable functional group in the molecule and having a weight-average molecular weight of 5,000–30,000, which process comprises subjecting polymerizable components (c) to radical copolymerization by using 5–10 mole %, based on the total moles of the polymerizable components (c), of a radical polymerization initiator in the presence of a chain transfer agent, said polymerizable components (c) consisting of 65–95% by weight of (a) a macromolecular monomer having a radical-polymerizable group at one end in the molecule and having a weight-average molecular weight of 1,000–10,000 and 35–5% by weight of (b) another radical-polymerizable monomer.

7. A process for producing a thermosetting coating resin according claim 5, wherein the thermosetting coating resin contains a unit of an alkyl (meth)acrylate monomer having an alkyl group of 1-8 carbon atoms in a proportion of 50% by weight or more based on the amount of total monomer units constituting the thermosetting coating resin.

8. A process for producing thermosetting coating resin according to claim 5, wherein the component (a) is a macromolecular monomer having a radical-polymerizable group at one end in the molecule, having a weight-average molecular weight of 1,000–10,000 and having carboxyl group or hydroxyl group in the polymer backbone.

9. A process for producing a thermosetting coating resin according to claim 5, wherein the radical-polymerizable group at one end of the macromolecular monomer is selected from the group consisting of (meth)acryloyl group, styryl group, allyl group, vinylbenzyl group, vinyl ether group and vinyl ketone group.

10. A process for producing a thermosetting coating resin according to any of claim 5, wherein the monomer constituting the polymer backbone of the macromolecular monomer is selected from the group consisting of methyl (meth)acrylate, ethyl (meth)acrylate, butyl (meth)acrylate, 2-ethylhexyl (meth)acrylate, perfluoroalkyl acrylates, 2-hydroxyethyl (meth)acrylate, 2-hydroxypropyl (meth)acrylate, styrene, α-methylstyrene, (meth)acrylonitrile and polyethylene glycol mono(meth)acrylate.

11. A process for producing a thermosetting coating resin according to claim 5, wherein the other radical-polymerizable monomer is selected from the group consisting of alkyl (meth)acrylates wherein the alkyl group has 1-18 carbon atoms, vinyl acetate, styrene, α-methylstyrene, (meth)acrylonitrile, perfluoroalkyl (meth)acrylates, (meth)acrylic acid, maleic anhydride, 2-hydroxyethyl (meth)acrylate, 2-hydroxypropyl (meth)acrylate, glycidyl (meth)acrylate, (meth)acrylamide, N-methylolacrylamide, N-butoxymethylacrylamide, N,N-dimethylaminoethyl (meth)acrylate and (meth)acryloyloxypropyltrimethoxysilane.

* * * * *